Dec. 23, 1947.   B. F. ARPS   2,433,019
COMBINATION SCOOP, BULLDOZER, AND SCRAPER
Filed May 10, 1945   2 Sheets-Sheet 1
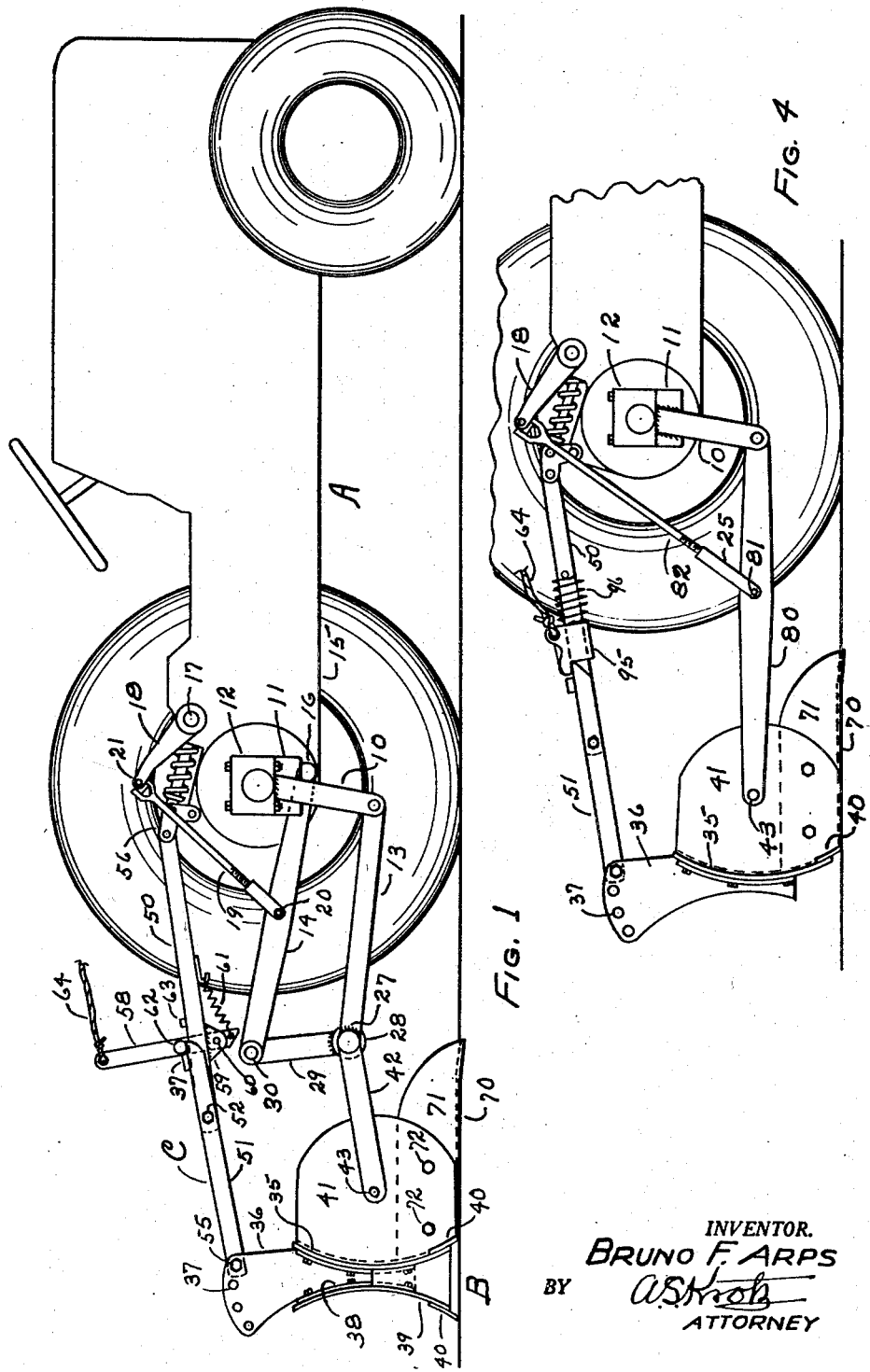
INVENTOR.
BRUNO F. ARPS
BY
ATTORNEY Dec. 23, 1947.  B. F. ARPS  2,433,019
COMBINATION SCOOP, BULLDOZER, AND SCRAPER
Filed May 10, 1945   2 Sheets-Sheet 2
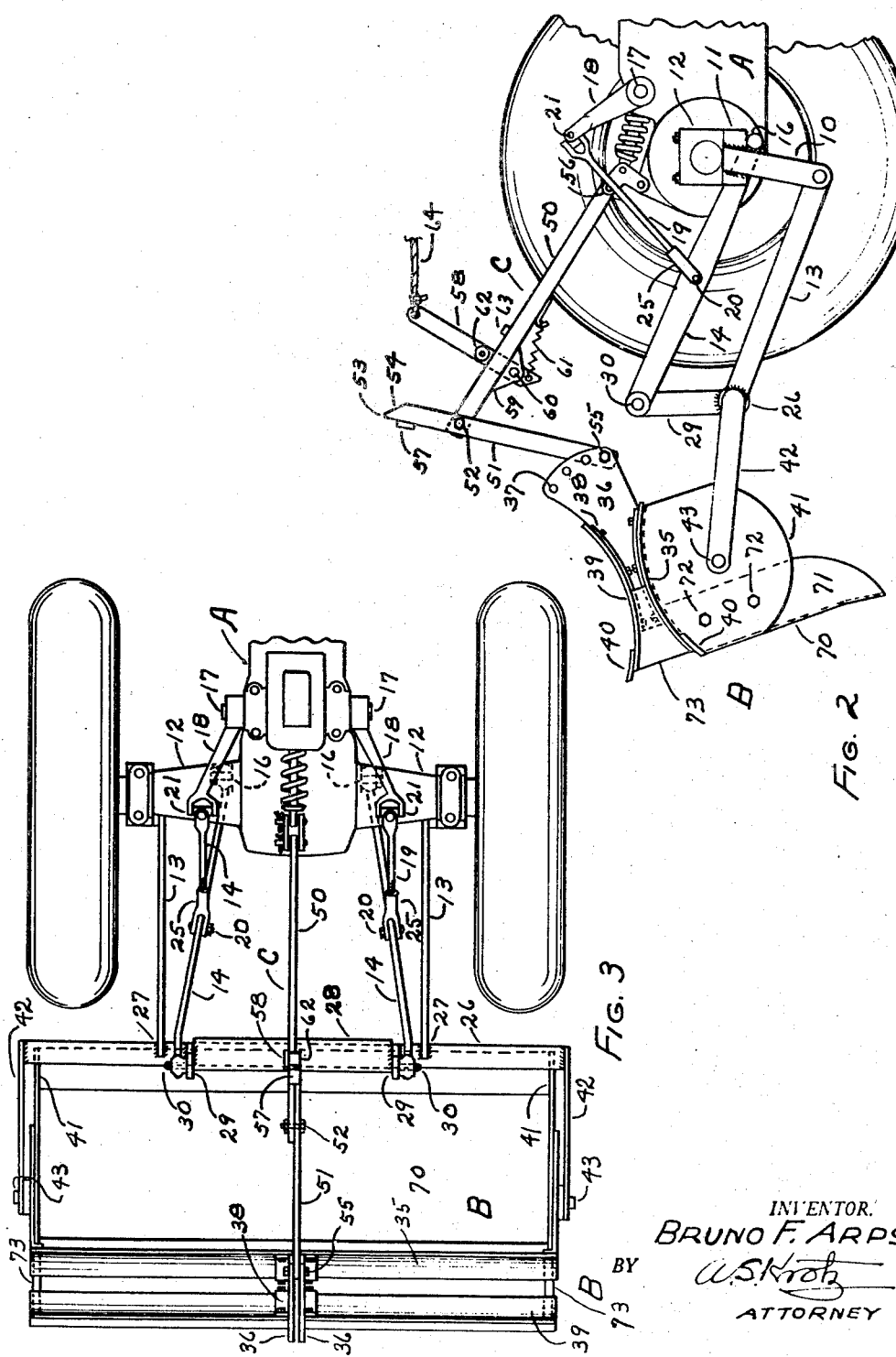
INVENTOR.
BRUNO F. ARPS
BY
ATTORNEY Patented Dec. 23, 1947

2,433,019

UNITED STATES PATENT OFFICE 2,433,019

COMBINATION SCOOP, BULLDOZER, AND SCRAPER

Bruno F. Arps, New Holstein, Wis.

Application May 10, 1945, Serial No. 592,935

9 Claims. (Cl. 37—126)

1

The present invention relates to an attachment for tractors for use in moving snow or dirt or as a pick up and dump scoop.

An object of the present invention is to provide a combination scraper with a dump scoop attachment which may be used conjointly or separately and having means whereby another scraper blade may be attached for pushing into the snow or dirt, bulldozer like.

One of the objects of the present invention is to provide a simple, light and strong attachment which can be manufactured at low cost.

A further object of the present invention is to provide an upper link connection for the device which is in the form of a toggle joint, to be used for dumping when a scoop is attached to the device, or for tipping the blade when used for pulling into the dirt or snow.

A still further object of the present invention is to provide a manually operated connection to the toggle joint which acts to lock the toggle into an operating position.

To these and other useful ends my invention consists of parts, combinations of parts or their equivalents and mode of operation as hereinafter described and claimed and shown in the accompanying drawings in which:

Fig. 1 is an elevational view of a conventional tractor showing my improved device attached thereto and when in an operating position.

Fig. 2 is a fractional view of the tractor showing the device in a lifted and dumped position.

Fig. 3 is a top view of the device as shown in Figure 1, except including a fraction of the tractor only.

Fig. 4 is a drawing of a modification.

As thus illustrated the tractor in its entirety is designated by reference character A, the tractor being preferably provided with depending hitch members 10 which are secured to brackets 11, which in turn are secured to axle housings 12. The near rear wheel is removed in Figures 1, 2 and 4 to clearly illustrate parts of my device which could not otherwise be seen. On the lower ends of members 10 I hingedly secure draw-bars 13—13. Members 14 at their forward ends are preferably hinged to the frame 15 of the tractor as at 16—16 (see dotted lines in Figure 3). Tractor A is provided with a hydraulic lift which is preferably located within frame 15 and having outwardly projecting shafts 17—17 to which rearwardly and upwardly extending arms 18—18 are secured. These arms are at their rear ends operatively connected to members 14 by means of links 19—19 as at 20—20 and 21—21.

Members 19 are at their lower ends screwthreaded into brackets 25—25, for a purpose which will be obvious. It will be noted that members 13 are parallel to each other so that the pull

2 or push on tube 26 is direct. Members 14 diverge rearwardly considerably. It is convenient to position the front ends of members 14 about as shown and it is desirable to position the rear ends of members 14 about as shown. Members 18 diverge rearwardly somewhat, so members 19 are substantially parallel with each other.

The rear ends of members 13 are secured to a tube 26 as at 27—27. A tube 28 fits loosely over tube 26 and has secured to its ends upwardly extending arms 29—29, the upper ends of these arms being hingedly connected to the rear ends of members 14 as at 30—30. I provide a scraper and dump scoop unit which in its entirety is designated by reference character B. This unit comprises preferably a scraper blade 35 having secured thereto spaced brackets 36—36. These brackets have at their upper ends a number of registering holes 37 for a purpose which will hereinafter appear.

On the rear surface of members 36 I provide flanges 38 suitably shaped for the reception of another scraper blade 39. This other scraper blade is preferably detachably mounted on members 36 and having preferably a knife blade 40. Scraper blade 35 is also provided with a knife blade 40. Blade 35 is preferably secured to members 36 by electric welding. On the ends of blade 35 I preferably removably secure forwardly extending plates 41—41. These plates being shaped about as shown, one of their purposes being to retain the material when blade 35 is used for scraping snow or dirt.

I provide links 42—42 which are preferably electric welded to the ends of tube 26, the rear ends being hingedly mounted on members 41 as at 43—43, thus forming the equivalent of draw-bar connections between members 10 and 41. I provide a jointed link between members 36 and the tractor frame 15 as follows:

This link is in its entirety designated by reference character C having a forward end 50 and a rear end 51 which are hinged together as at 52, member 51 extending forwardly and terminating as at 53, this end 53 being tapered as at 54. Member 51 at its rear end is hingedly secured to members 36 by means of a bolt 55, in whatever position will hold the blade 38 at the desired angle. The front end of member 50 is hinged to the tractor frame as at 56. The forward end of member 51 is provided with a stop 57 adapted to lay on the top of member 50, this stop being arranged so when in contact with member 50, hinge 52 is either in line with the plane of members 55 and 56 or slightly below this plane.

A lever 58 is pivoted to a bracket 59 as at 60 having a spring 61 and a roller 62, the roller being adapted to contact surface 54 and ride over the end of member 51, when member 52 reaches its lowest position. The principal function of roller 62 is to hold the link mechanism from being moved upwardly accidentally out of its operating position; for example by the accumulation of snow or dirt in front of scraper 35 which might raise high enough to push upwardly on member 51 and release the device. A stop 63 limits the forward movement of member 58 so if the link C does not trip when roller 62 is moved forward of the front end of member 51 then an extra pull on the rope 64 by the tractor operator will release the links and even assist in the tipping movement of the scraper or scoop.

I provide a scoop attachment which is preferably formed from an integral sheet of steel. The bottom 70 has side members 71—71 which are removably secured to members 41 by means of bolts 72.

It will be seen that scraper 35 and its blade 40 will answer as an end gate to the scoop and that the scoop may be loaded, raised by the power lift and dumped at will; that openings 37 in members 36 may be used for changing the down suck of the scoop; and that when scraper blade 39 is attached to members 36, the device may be used as a bulldozer. It will be understood that detachable means 73 (see Figure 3) may be used for securing the ends of the scrapers together in order to stiffen the structure when used for bulldozer work.

Referring now to Figure 4; a member 95 may be slidably mounted on member 50 having a spring 96 adapted to cause this member to engage the end of member 51 (as shown) to lock the toggle in an operating position and whereby a pull on rope 64 will release the toggle and permit the blade to tip forwardly as in the other design.

In Figure 4, the scoop and its connected parts are the same as in the other figures, the draw-bar connection however being different and as follows:

Single draw-bar links 80 are pivoted to members 10 at their front ends and directly to member 41 as at 43. Power lift arms 18 are connected directly to links 80 as at 81 by means of links 82. These links are similar to links 19, except they are longer, thus it will be seen that two members 80 take the place of members 13, 14, 26, 28, 29 and 42, thus simplifying the structure to a considerable extent.

Thus it will be seen that I have provided an attachment for tractors which can be used for various purposes; that it is positive in its action; that it is definitely locked in its operating position, is light and strong and conveniently operated.

Having thus shown and described my invention I claim:

1. In combination with a tractor having a power lift, transversely spaced draw-bars hingedly connected at their front ends to the tractor, a transverse member having the rear ends of said draw-bars rigidly connected thereto, supplemental bars spaced a distance above said draw-bars and being hingedly connected at their forward ends to the tractor, a tube positioned on said transverse member intermediate the ends thereof, upwardly extending links secured to the ends of said tube and having hinge connections at their upper ends to the rear ends of the supplemental bars, said power lift having an operating connection to said supplemental bars intermediate the ends of the bars, a scraper blade having forwardly extending members secured to its ends, rearwardly extending links rigidly secured to the ends of said transverse member and being hingedly connected at their rear ends to said forwardly extending members, a bracket secured to the upper side of said scraper blade, a link member forming a connection between said bracket and the tractor for holding the blade in an upright position.

2. A device as recited in claim 1 including; a number of longitudinally spaced holes in said bracket, whereby the rear end of said link member may be adjusted in its position relative to the bracket for determining the vertical position of the scraper blade.

3. A device as recited in claim 1 including; manually controlled means associated with said link member for permitting said bracket to move forward relative to the tractor.

4. A device as recited in claim 1 including; said link member having a hinge connection intermediate its ends forming a toggle to thereby fix the length of the link member when the hinge is substantially on a plane with the front and rear ends of the link member, manually operated means for raising said hinge for tilting the scraper blade forwardly.

5. A device as recited in claim 1 including; said link having a hinged joint intermediate its ends forming a toggle, means whereby the toggle is locked when the hinge joint is in its lowest position, means whereby the tractor operator can manually release said locking means and raise said joint for tilting the scraper.

6. A device as recited in claim 1 including; said link member having a hinge connection intermediate its ends forming a toggle to thereby fix the length of the link member when the hinge is substantially on a plane with the front and rear ends of the link member, a lever hingedly connected to said link member having means whereby when the lever is released, the link member will be locked into its elongated position and whereby when the lever is moved forwardly at its free end, the toggle will be released to thereby release the scraper.

7. A device as recited in claim 1 including; said forwardly extending members comprising plates with curved front ends whereby when the scraper is tilted the plates will be caused to roll on the ground surface and lift the blade.

8. In combination with a tractor having a power lift; transversely spaced draw-bars hingedly connected at their front ends to the tractor, a transverse member having the rear ends of said draw-bars rigidly connected thereto, supplemental bars spaced a distance above said draw-bars and being hingedly connected at their forward ends to the tractor, a tube positioned on said transverse member intermediate the ends of the bar, upwardly extending links secured to the ends of said tube and having hinge connections at their upper ends to the rear ends of the supplemental bars, said power lift having an operating connection to said supplemental bars intermediate the ends of the bars, a scraper blade having forwardly extending members secured to its ends, rearwardly extending links rigidly secured to the ends of said transverse member and being hingedly connected at their rear ends to said forwardly extending members, a bracket secured to the upper side of said scraper blade, a link member forming a connection between said bracket and the tractor for holding the blade in an upright position, a scoop member detachably secured to and between said forwardly extending members, manually operated means associated with said link member adapted to permit a forward movement of said bracket for dumping the scoop.

9. A device as recited in claim 1 including, another scraper blade secured to the rear side of said bracket and first scraper blade with its concave side positioned rearwardly and being positioned vertically whereby it may be used bulldozer fashion for moving dirt rearwardly.

BRUNO F. ARPS.

REFERENCES CITED

The following references are of record in the file of this patent:

UNITED STATES PATENTS

| Number | Name | Date |
|---|---|---|
| 1,891,428 | LeBleu | Dec. 20, 1932 |
| 2,008,178 | Harrison | July 16, 1935 |
| 2,346,757 | Horner | Apr. 18, 1944 |
| 2,359,121 | Kinnan | Sept. 26, 1944 |
| 2,389,199 | Laird | Nov. 20, 1945 |